United States Patent
Hung et al.

(10) Patent No.: US 12,224,695 B2
(45) Date of Patent: Feb. 11, 2025

(54) MOTOR CONTROL DEVICE FOR ACHIEVING SAFE AND EFFICIENT BRAKING AND MOTOR BRAKING METHOD THEREOF

(71) Applicant: WELTREND SEMICONDUCTOR INC., Hsinchu (TW)

(72) Inventors: Chien-Tsung Hung, Hsinchu (TW); Yu-Kai Wong, Hsinchu (TW); Meng-Che Tsai, Hsinchu (TW)

(73) Assignee: WELTREND SEMICONDUCTOR INC., Hsinchu (TW)

( * ) Notice: Subject to any disclaimer, the term of this patent is extended or adjusted under 35 U.S.C. 154(b) by 128 days.

(21) Appl. No.: 18/123,340

(22) Filed: Mar. 20, 2023

(65) Prior Publication Data
US 2024/0213895 A1 Jun. 27, 2024

(30) Foreign Application Priority Data
Dec. 22, 2022 (TW) .................................. 111149379

(51) Int. Cl.
*H02P 3/18* (2006.01)
(52) U.S. Cl.
CPC ..................................... *H02P 3/18* (2013.01)

(58) Field of Classification Search
CPC .. H02P 3/22; H02P 3/18; H02P 29/025; H02P 3/24; H02P 6/24; H02P 1/029
See application file for complete search history.

(56) References Cited

U.S. PATENT DOCUMENTS

| 11,047,528 | B2 | 6/2021 | Vanko |
| 2018/0013360 | A1 | 1/2018 | Eshleman |
| 2020/0028452 | A1* | 1/2020 | Alcorn ................. H02P 29/025 |

FOREIGN PATENT DOCUMENTS

| JP | 6361018 | 7/2018 |
| TW | I289001 | 10/2007 |
| WO | 2015/008486 A1 | 1/2015 |
| WO | 2022/170548 A1 | 8/2022 |

* cited by examiner

*Primary Examiner* — Said Bouziane
(74) *Attorney, Agent, or Firm* — Winston Hsu (57) ABSTRACT

A motor is coupled to a motor control device including a set of high-side switches, a set of low-side switches, a capacitor and a controller. The set of high-side switches and the set of low-side switches are coupled to the motor. The capacitor is coupled to the set of high-side switches. The controller is coupled to the capacitor, the set of high-side switches and the set of low-side switches. A method of braking the motor includes upon the motor being disconnected from an external power source, the controller receiving a supply voltage from the capacitor, turning on the set of low-side switches, turning off the set of high-side switches, and the controller switching the set of low-side switches according to the supply voltage.

9 Claims, 7 Drawing Sheets

MOTOR CONTROL DEVICE FOR ACHIEVING SAFE AND EFFICIENT BRAKING AND MOTOR BRAKING METHOD THEREOF

BACKGROUND OF THE INVENTION

1. Field of the Invention

The invention relates to a motor, in particular, to a motor control device for achieving safe and efficient braking and a motor braking method thereof.

2. Description of the Prior Art

Motors convert electrical energy into mechanical energy and perform work to generate kinetic energy to drive other devices. Motors are widely used in heavy industry, home appliances, and small toys. In general, a motor braking control method involves a control unit turning on the low-side switch to guide the electric energy generated by the kinetic energy of the motor to the ground terminal, so as to balance the voltages of the motor windings and brake the motor. However, when the power supply is removed, the low-side switch cannot remain turned on to complete the motor braking operation owing to the loss of power to the control unit. Further, since the low-side switch is turned off at an uncontrollable point in time, the voltage generated by the back electromotive force will be fed back to the power supply, resulting in damages to the motor components.

SUMMARY OF THE INVENTION

According to an embodiment of the invention, a motor is coupled to a motor control device including a set of high-side switches, a set of low-side switches, a capacitor and a controller. The set of high-side switches and the set of low-side switches are coupled to the motor. The capacitor is coupled to the set of high-side switches. The controller is coupled to the capacitor, the set of high-side switches and the set of low-side switches. A method of braking the motor includes after the motor is disconnected from an external power supply, the controller receiving a supply voltage from the capacitor, turning on the set of low-side switches, turning off the set of high-side switches, and the controller switching the set of low-side switches according to the supply voltage.

According to another embodiment of the invention, a motor control device for braking a motor including a set of high-side switches, a set of low-side switches, a capacitor and a controller. The set of high-side switches is coupled to the motor. The set of low-side switches is coupled to the motor. The capacitor is coupled to the set of high-side switches. The controller is coupled to the capacitor, the set of high-side switches, and the set of low-side switches, and is used to receive a supply voltage from the capacitor after the motor is disconnected from an external power source, turn on the set of low-side switches, turn off the set of high-side switches, and switch the set of low-side switches according to the supply voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
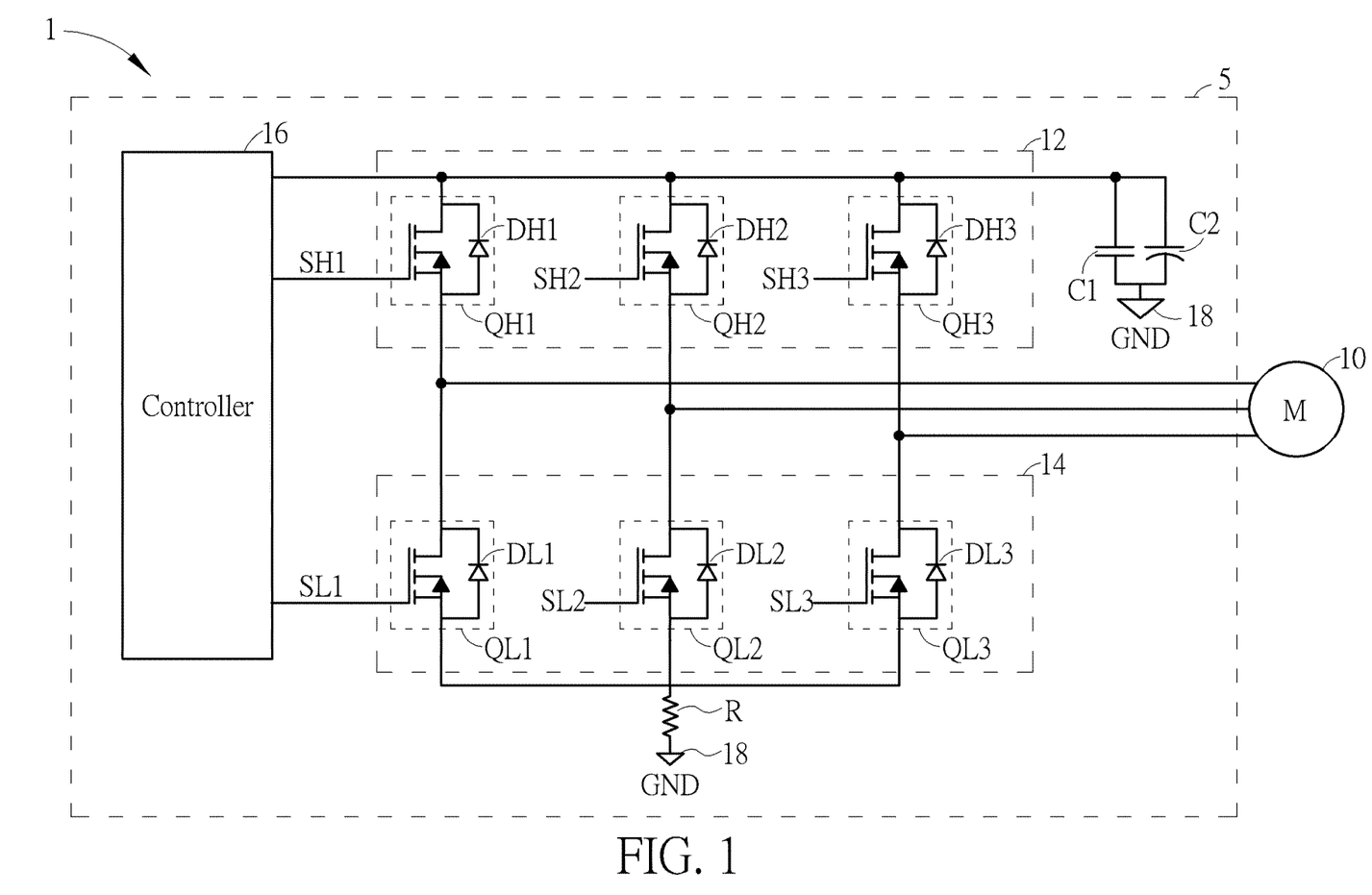
FIG. 1 is a schematic diagram of a motor system according to an embodiment of the invention.

FIG. 1 is a schematic diagram of a motor system 1 according to an embodiment of the invention. The motor system 1 may include a motor control device 5 and a motor 10. When the motor 10 is disconnected from an external power source, the motor control device 5 may store the kinetic energy of the motor 10 to maintain the power supply and extend the braking time, so as to brake the motor 10 safely and efficiently.

The motor control device 5 may include a set of high-side switches 12, a set of low-side switches 14, a capacitor C1, a capacitor C2 and a controller 16. The set of high-side switches 12 and the set of low-side switches 14 are coupled to the motor 10. The capacitor C1 includes a first terminal coupled to the set of high-side switches 12 and the controller 16, and a second terminal coupled to a ground terminal 18, the ground terminal 18 providing a ground voltage GND. Similarly, the capacitor C2 includes a first terminal coupled to the second terminal of the switch 12 and the controller 16, and a second terminal coupled to the ground terminal 18. The controller 16 is further coupled to the set of low-side switches 14. The controller 16 may include a microcontroller, a microprocessor, a field programmable gate array (FPGA), or other types of control circuits.

The motor 10 may be a three-phase brushless direct current (BLDC) motor, the set of high-side switches 12 may include transistors QH1 to QH3, and the set of low-side switches 14 may include transistors QL1 to QL3. The transistors QH1 to QH3 and QL1 to QL3 may be, but not limited to, N-type metal-oxide-semiconductor field-effect transistors (MOSFET). In some embodiments, the transistors QH1 to QH3 and QL1 to QL3 may be P-type transistors or other types of N-type transistors. The transistor QH1 may include a control terminal coupled to the controller 16, a first terminal coupled to the first terminal of the capacitor C1 and the first terminal of the capacitor C2, and a second terminal. The transistor QL1 may include a control terminal coupled to the controller 16; a first terminal coupled to the second terminal of the transistor QH1; and a second terminal coupled to the ground terminal 18 via a resistor R. The resistor R may be a current sensing resistor for measuring a total motor current. Similarly, the transistor QH2 may include a control terminal coupled to the controller 16, a first terminal coupled to the first terminal of the capacitor C1 and the first terminal of the capacitor C2, and a second terminal. The transistor QL2 may include a control terminal coupled to the controller 16, a first terminal coupled to the second terminal of the transistor QH2, and a second terminal coupled to the ground terminal 18 via the resistor R. The transistor QH3 may include a control terminal coupled to the controller 16, a first terminal coupled to the first terminal of the capacitor C1 and the first terminal of the capacitor C2, and a second terminal. The transistor QL3 may include a control terminal coupled to the controller 16, a first terminal coupled to the second terminal of the transistor QH3, and a second terminal coupled to the ground terminal 18 via the resistor R. The transistors QH1 to QH3 and QL1 to QL3 may have body diodes DH1 to DH3 and DL1 to DL3 respectively.

The transistors QH1 and QL1 may respectively control the charging and discharging of the first phase (e.g., U phase), the transistors QH2 and QL2 may respectively control the charging and discharging of the second phase (e.g., V phase), and transistors QH3 and QL3 may respectively control the charging and discharging of the third phase (e.g., W phase). The controller 16 may generate control signals SH1 to SH3 and SL1 to SL3 to control the transistors QH1 to QH3 and QL1 to QL3, respectively. Setting the control signals SH1 to SH3 and SL1 to SL3 to a logic high level may turn on the control transistors QH1 to QH3 and QL1 to QL3, respectively. Setting the control signals SH1 to SH3 and SL1 to SL3 to a logic low level may turn off the control transistors QH1 to QH3 and QL1 to QL3, respectively. The capacitor C1 may serve as a first voltage stabilizing component to filter voltage disturbance generated by pulse width modulation (PWM) pulses in the control signals SH1 to SH3 and SL1 to SL3. The capacitor C2 may serve as a second voltage stabilizing component to reduce the voltage disturbance generated by the commutation of the motor.

When the motor 10 is disconnected from the external power supply, the voltage across the capacitors C1 and C2 is still equal to the external power supply, the controller 16 may turn off the set of high-side switches 12 and control the switching of the set of low-side switches 14 to brake the motor 10. The external power source may be a battery, a power supply or other power sources. In some embodiments, after the motor 10 is disconnected from the external power supply, the controller 16 may receive a supply voltage VBB from the capacitors C1 and C2, and simultaneously turn on the transistors QL1 to QL3 and turn off the transistors QH1 to QH3 to guide the motor current generated by the back electromotive force (EMF) of the motor 10 to the ground terminal 18, achieving balanced three-phase voltages of the motor 10, braking the motor 10 while reducing the supply voltage VBB quickly. Then the controller 16 may switch the set of low-side switches 14 according to the supply voltage VBB. In some embodiments, the controller 16 may determine whether the supply voltage VBB is less than the first target voltage Vt1. If the supply voltage VBB is less than a first target voltage Vt1, the controller 16 may simultaneously turn off the transistors QL1 to QL3 and the transistor QH1 to QH3. Since the transistors QL1 to QL3 are turned off, the motor current cannot flow through the transistors QL1 to QL3, but can flow through the parasitic diodes DH1 to DH3 of the transistors QH1 to QH3 to recharge the capacitors C1 and C2, boosting the supply voltage VBB. The rotations of the motor 10 can induce the back EMF to generate the electric energy for recharging, so there is no need to store the electric energy in advance, and there is no need for additional charging, discharging and/or isolation components in the motor system 1, without adding the manufacturing costs and increasing the circuit size. The first target voltage Vt1 may be between the rated voltage of the motor 10 and the turn-off voltage of the controller 16. For example, the rated voltage of the motor 10 may be 12 volts (V), the turn-off voltage of the controller 16 may be 3V, and the first target voltage Vt1 may be set to 6V.

The boosted supply voltage VBB may maintain the power supply to the controller 16. In some embodiments, the controller 16 may further determine whether the supply voltage VBB exceeds a second target voltage Vt2. If the supply voltage VBB exceeds the second target voltage Vt2, the controller 16 may simultaneously turn on the transistors QL1 to QL3 and turn off the transistors again. Consequently, the transistors QH1 to QH3 guide the motor current from the motor 10 to the ground terminal 18 to brake the motor 10 continuously while reducing the supply voltage VBB. The second target voltage Vt2 may be greater than the first target voltage Vt1 and less than a damage voltage of the controller 16, the set of high-side switches 12 or the set of low-side switches 14. For example, the damage voltage of the controller 16, the set of high-side switches 12 or the set of low-side switches 14 may be 30V, and the second target voltage Vt2 may be set as 24V. Since the supply voltage VBB does not exceed the second target voltage Vt2, the components in the motor system 1 will not be damaged by the high supply voltage VBB generated by the back EMF.

The motor system 1 does not need additional charging, discharging and/or isolation components, significantly extending the braking time of the motor 10 by turning off the set of high-side switches 12 and controlling the switching of the set of low-side switches 14, preventing the back EMF from driving the supply voltage VBB too high to damage the motor system 1, while keep the circuit size and manufacturing cost unchanged.

Figure 2:
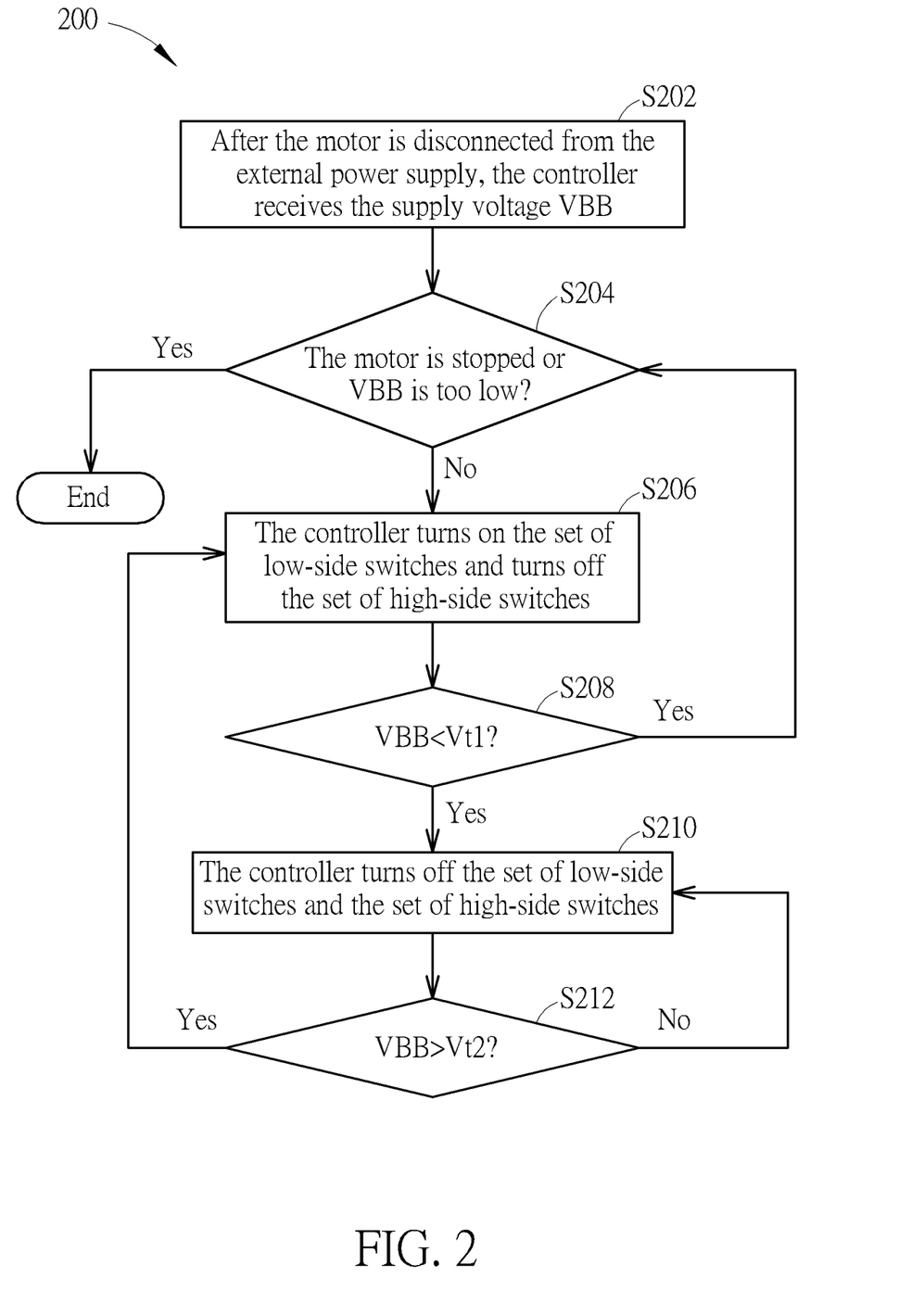
FIG. 2 is a flowchart of a method of braking the motor system in FIG. 1.

FIG. 2 is a flowchart of a method of braking the motor system in FIG. 1. The method 200 includes Steps S202 to S212 to extend the braking time of the motor 10 while preventing the motor system 1 from being damaged by the supply voltage VBB. Any reasonable step change or adjustment is within the scope of the present disclosure. Steps S202 to S212 are detailed as follows:

Step S202: After the motor 10 is disconnected from the external power supply, the controller 16 receives the supply voltage VBB from the capacitors C1 and C2;

Step S204: The controller 16 determines whether the motor 10 is stopped or the supply voltage VBB is too low? If so, terminate the method 200; if not, continue to Step S206;

Step S206: The controller 16 turns on the set of low-side switches 14 and turns off the set of high-side switches 12;

Step S208: The controller 16 determines whether the supply voltage VBB is less than the first target voltage Vt1? If so, proceed to Step S210; if not, return to Step S204;

Step S210: The controller 16 turns off the set of low-side switches 14 and the set of high-side switches 12;

Step S212: The controller 16 determines whether the supply voltage VBB exceeds the second target voltage Vt2? If so, return to Step S206; if not, return to Step S210.

Figure 3:
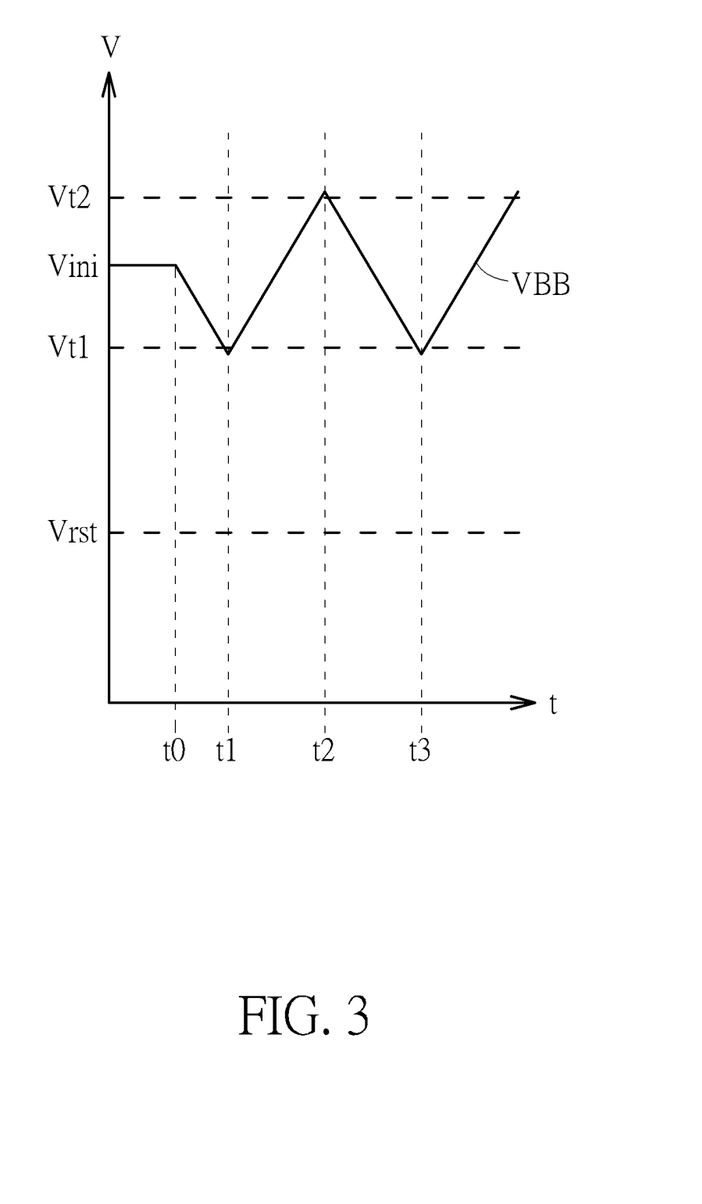
FIG. 3 shows a waveform of the supply voltage of the motor system in FIG. 1.
Figure 4:
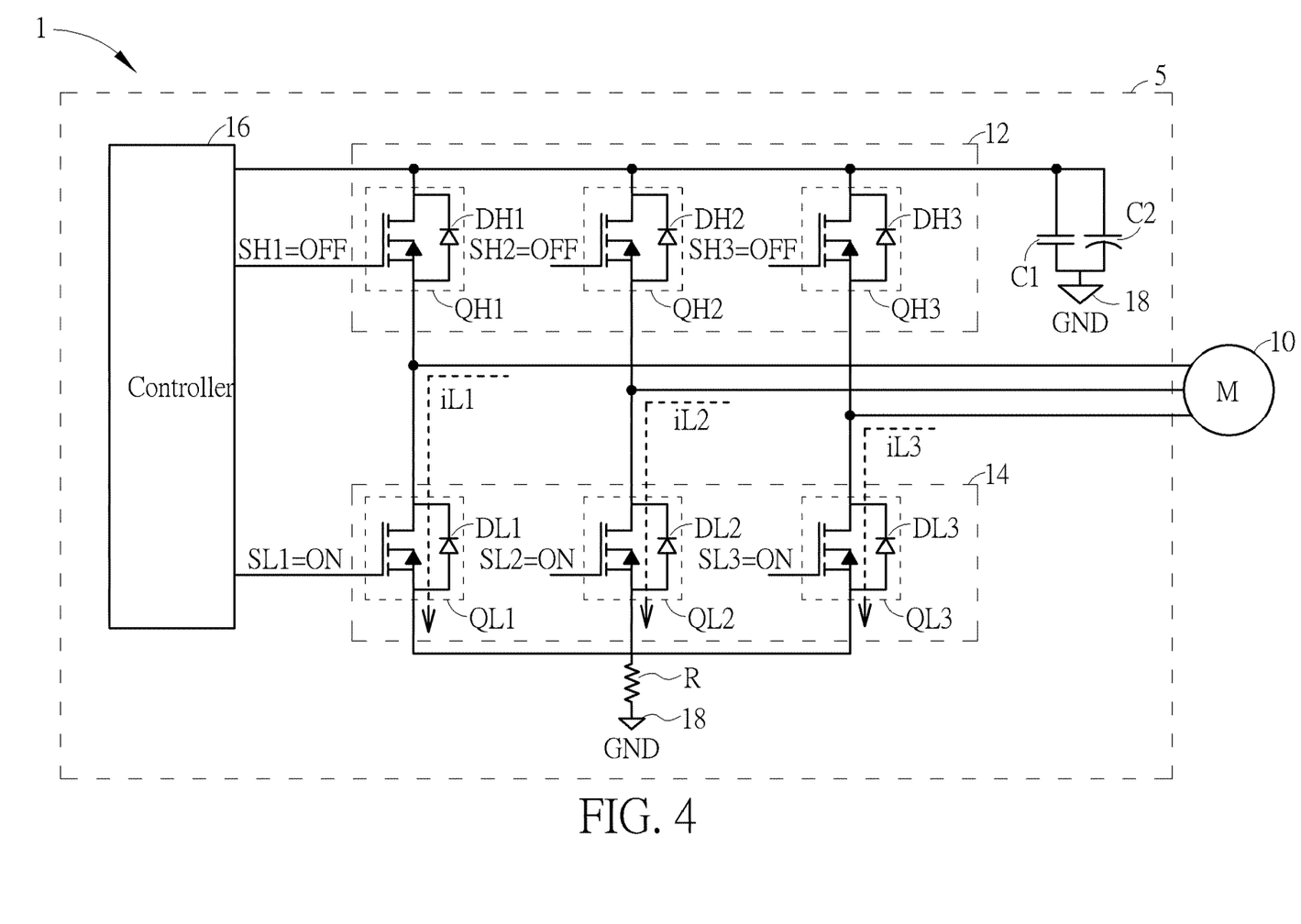
FIG. 4 is a schematic diagram of braking the motor in FIG. 1.
Figure 5:
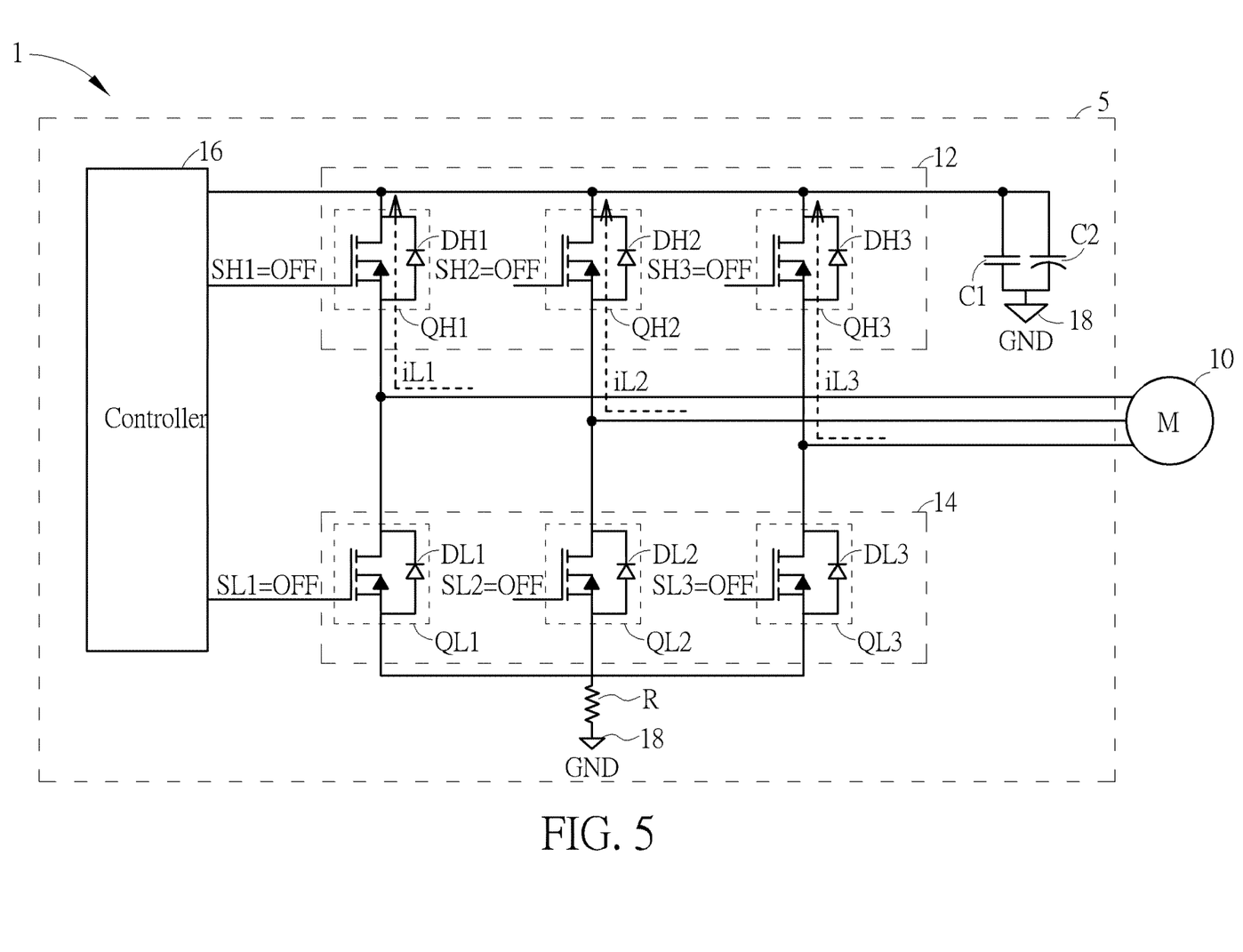
FIG. 5 is a schematic diagram of charging the motor in FIG. 1.

The method 200 will be explained in the following paragraphs with reference to FIG. 5. FIG. 3 shows a waveform of the supply voltage VBB of the motor 10, where the horizontal axis represents time t, and the vertical axis represents voltage V. FIG. 4 and FIG. 5 are schematic diagrams of braking and charging of the motor 10, respectively.

Referring to FIG. 3, at Time t0, the motor 10 is disconnected from the external power supply, the supply voltage VBB is at the initial level Vini, the controller 16 receives the supply voltage VBB from the capacitors C1 and C2 (Step S202), and determines whether the motor 10 is stopped or the supply voltage VBB is too low (Step S204). In some embodiments, the controller 16 may determine whether the motor 10 is stopped according to the back EMF of the motor 10 or a sensor (such as a Hall sensor), and compare the supply voltage VBB and the turn-off voltage Vrst to determine whether the supply voltage VBB is too low. Since the motor 10 is not stopped at Time t0 and the supply voltage VBB exceeds the turn-off voltage Vrst of the controller 16, the controller 16 turns on the set of low-side switches 14 and turns off the set of high-side switches 12 (Step S206). Referring to FIG. 4, when the transistors QL1 to QL3 are turned on and the transistors QH1 to QH3 are turned off, the motor current iL1 to iL3 flows through the transistors QL1 to QL3 to the ground terminal 18, respectively, achieving balanced three-phase voltages of the motor 10 and braking the motor 10. Therefore, between Time t0 and Time t1 in FIG. 3, the supply voltage VBB drops quickly, and the controller 16 continues to determine whether the supply voltage VBB is less than the first target voltage Vt1 (Step S208).

At Time t1, the controller 16 determines that the supply voltage VBB is less than the first target voltage Vt1, and therefore, the controller 16 turns off the set of low-side switches 14 and the set of high-side switches 12 (Step S210). Referring to FIG. 5, when the transistors QL1 to QL3 are turned off and the transistors QH1 to QH3 are turned off, the motor currents iH1 to iH3 respectively flow through the parasitic diodes DH1 to DH3 of the transistors QH1 to QH3 to recharge the capacitors C1 and C2, so as to store the electric energy and boost the supply voltage VBB. Therefore, between Time t1 and Time t2 in FIG. 3, the supply voltage VBB increases, and the controller 16 continues to determine whether the supply voltage VBB exceeds the second target voltage Vt2 (Step S212).

At Time t2, the controller 16 determines that the supply voltage VBB exceeds the second target voltage Vt2, and therefore, the controller 16 turns on the set of low-side switches 14 and turns off the set of high-side switches 12 (Step S206), and the supply voltage VBB starts to drop. Between Time t2 and Time t3, the supply voltage VBB continues to drop, the controller 16 continues to determine whether the supply voltage VBB is less than the first target voltage Vt1 (Step S208), and determines that the supply voltage VBB is less than the first target voltage Vt1 at Time t3. Therefore, the controller 16 turns off the set of low-side switches 14 and the set of high-side switches 12 (Step S210), and the supply voltage VBB rises again.

The motor system 1 repeats the loop from Steps S204 to S212 according to the braking method 200 until the controller 16 determines that the motor 10 is stopped and/or the supply voltage VBB is too low.

Figure 6:
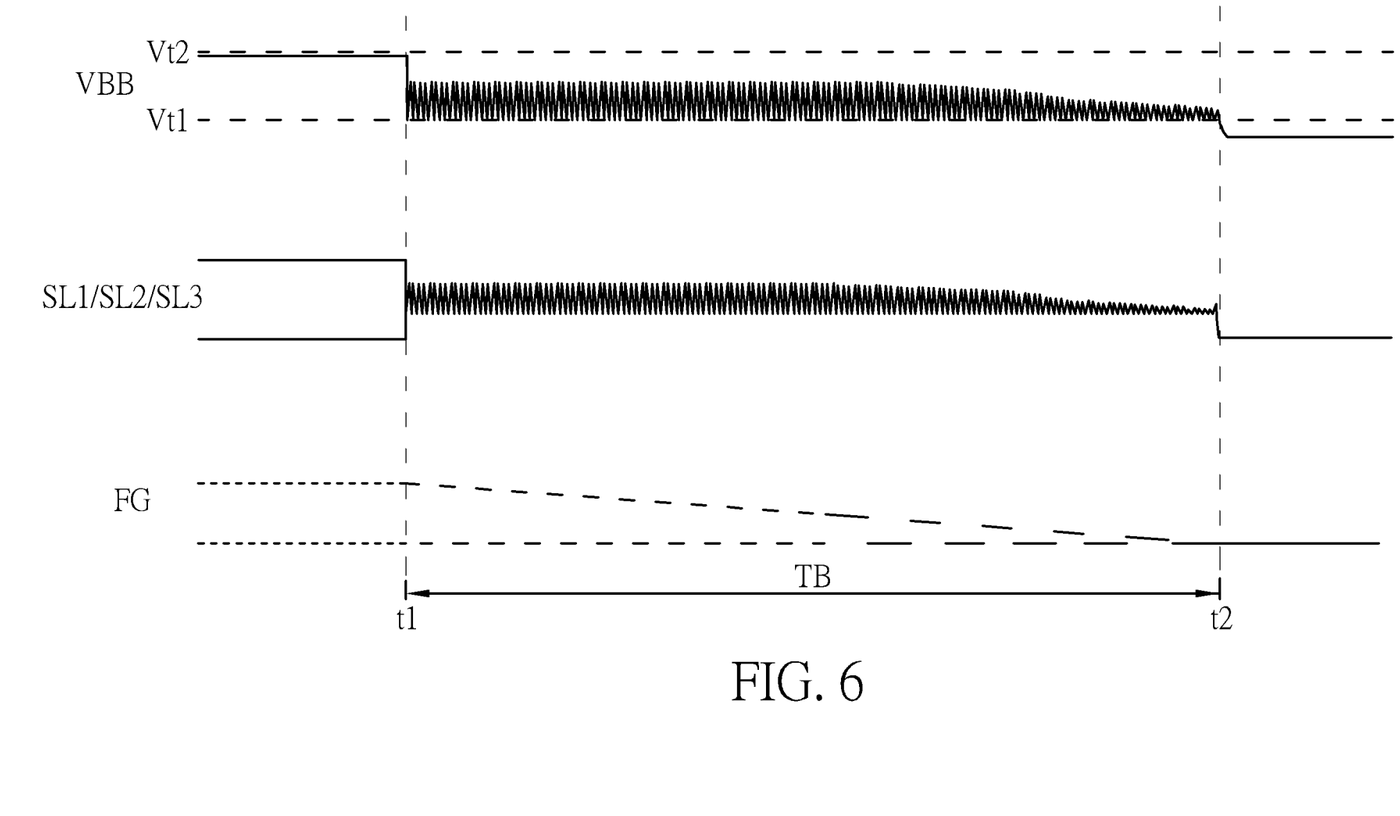
FIG. 6 shows waveforms of the motor system in FIG. 1.

FIG. 6 shows waveforms of the motor system 1, where the horizontal axis represents time and the vertical axis represents voltage. At Time t1, the motor 10 is disconnected from the external power source. Between Time t1 and Time t2, the motor currents repeatedly discharge the electric energy from the capacitors C1 and C2 and recharge the electric energy to the capacitors C1 and C2, and therefore, the supply voltage VBB will be limited between the first target voltage Vt1 and the second target voltage Vt2, for the controller 16 to operate normally and switch the control signals SL1 to SL3 of the transistors QL1 to QL3 according to the supply voltage VBB. The interval between Time t1 and Time t2 may be referred to as a braking period TB. The motor system 1 may significantly extend the braking time TB, effectively reducing the motor speed FG.

Figure 7:
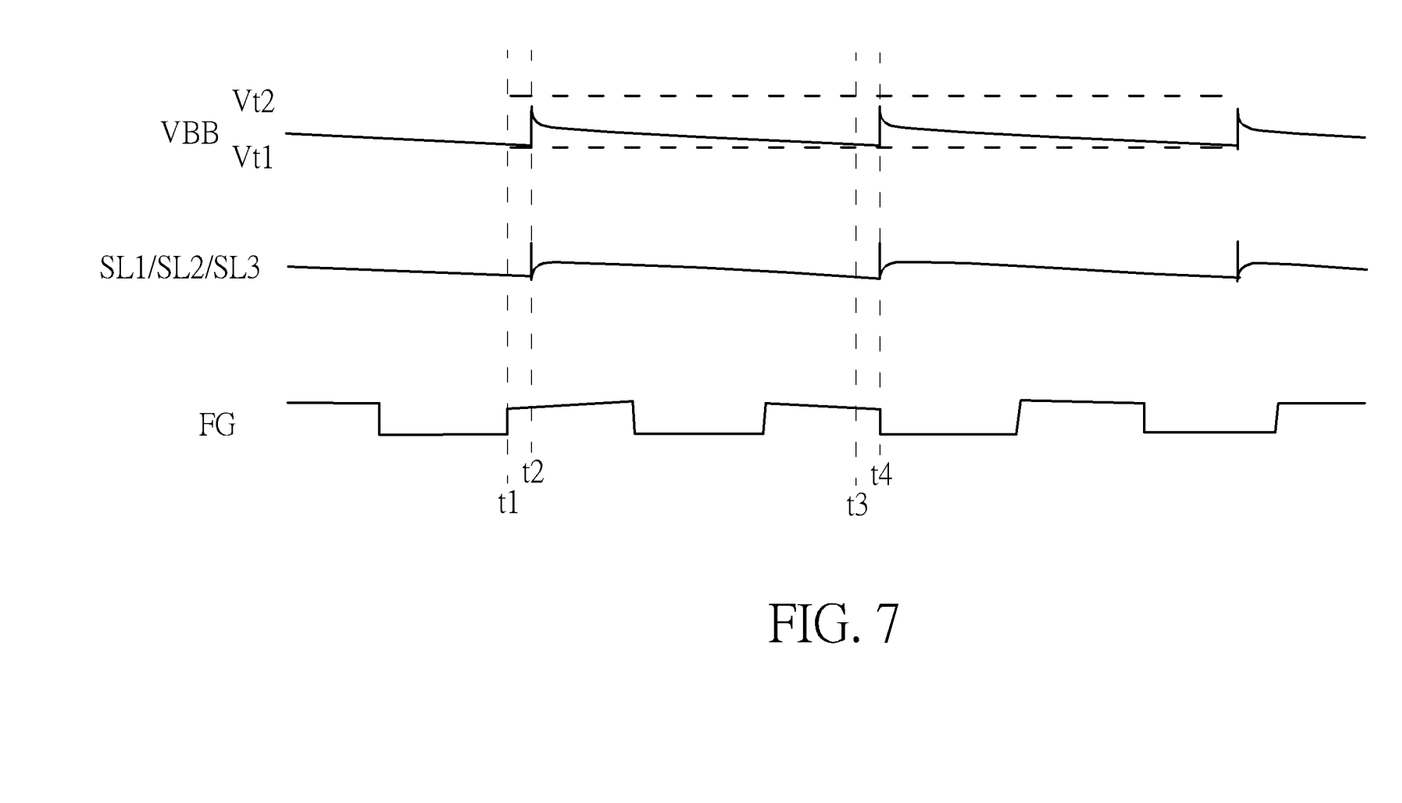
FIG. 7 shows enlarged waveforms of the motor system in FIG. 1.

FIG. 7 shows enlarged waveforms of the motor system 1, where the horizontal axis represents time and the vertical axis represents voltage. At Time t1, the supply voltage VBB is less than the first target voltage Vt1, and therefore, the control signals SL1 to SL3 are set to the logic low level to turn off the transistors QL1 to QL3 respectively. Between Time t1 and Time t2, the motor currents iH1 to iH3 recharge the capacitors C1 and C2 and boost the supply voltage VBB. At Time t2, when the supply voltage VBB reaches the second target voltage Vt2, the control signals SL1 to SL3 are set to the logic high level to turn on the transistors QL1 to QL3, respectively. Between Time t2 and Time t3, the motor currents iL1 to iL3 are guided to the ground terminal 18 via the transistors QL1 to QL3 to continue the braking operation, and the supply voltage VBB continues to drop.

At Time t3, the supply voltage VBB is less than the first target voltage Vt1, and therefore, the control signals SL1 to SL3 are set to the logic low level to turn off the transistors QL1 to QL3 respectively. Between Time t3 and Time t4, the motor currents iH1 to iH3 recharge the capacitors C1 and C2 and boost the supply voltage VBB. At Time t4, when the supply voltage VBB reaches the second target voltage Vt2, the control signals SL1 to SL3 are set to the logic high level to turn on the transistors QL1 to QL3, respectively. After time t4, the motor currents iL1 to iL3 are guided to the ground terminal 18 via the transistors QL1 to QL3 to continue the braking operation, and the supply voltage VBB continues to drop.

The motor system 1 may repeat the operation from Times t1 to t3 until the kinetic energy of the motor is completely consumed, the motor 10 is stopped and/or the supply voltage VBB is too low. Since the controller 16 switches the control signals SL1 to SL3 to maintain the supply voltage VBB between the first target voltage Vt1 and the second target voltage Vt2, the controller 16 may be operated normally to extend the braking time TB without causing damage to the motor system 1.

In the embodiments, the motor control device 5 and the braking method use the electric energy generated by the rotations of the motor to charge the capacitors C1 and C2 upon the external power supply being disconnected from the motor, so that the controller 16 may obtain continuous power supply, thereby significantly extending the turn-on time of the set of low-side switches 14 to achieve effective power-off braking, and limiting the supply voltage VBB between the first target voltage Vt1 and the second target voltage Vt2 to protect peripheral components of the motor from being damaged.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for braking a motor, the motor being coupled to a motor control device, the motor control device comprising a set of high-side switches, a set of low-side switches, a capacitor and a controller, the set of high-side switches and the set of low-side switches being coupled to the motor, the capacitor being coupled to the set of high-side switches, the controller being coupled to the capacitor, the set of high-side switches and the set of low-side switches, the method comprising:
    after the motor is disconnected from an external power supply, the controller receiving a supply voltage from the capacitor, turning on the set of low-side switches, and turning off the set of high-side switches;
    determining whether the supply voltage is less than a first target voltage; and if the supply voltage is less than the first voltage, the controller turning off the set of low-side switches and turning off the set of high-side switches.

2. The method of claim 1, further comprising:
the controller determining whether the supply voltage exceeds a second target voltage, the second target voltage being larger than the first target voltage; and
if the supply voltage exceeds the second target voltage, the controller turning on the set of low-side switches and turning off the set of high-side switches.

3. The method of claim 2, wherein the second target voltage is less than a damage voltage of the controller, the set of high-side switches, or the set of low-side switches.

4. The method of claim 1, wherein the first target voltage is between a rated voltage of the motor and a turn-off voltage of the controller.

5. A motor control device for braking a motor, the motor control device comprising:
a set of high-side switches coupled to the motor;
a set of low-side switches coupled to the motor;
a capacitor coupled to the set of high-side switches; and
a controller coupled to the capacitor, the set of high-side switches, and the set of low-side switches, configured to receive a supply voltage from the capacitor after the motor is disconnected from an external power source, turn on the set of low-side switches, turn off the set of high-side switches, determine whether the supply voltage is less than a first target voltage, and if the supply voltage is less than the first target voltage, turn off the set of low-side switches and turn off the set of high-side switches.

6. The motor control device of claim 5, wherein:
the controller is further configured to determine whether the supply voltage exceeds a second target voltage, and turn off the set of low-side switches and turn off the set of high-side switches if the supply voltage is less than the first target voltage; and
the second target voltage is larger than the first target voltage.

7. The motor control device of claim 6, wherein the second target voltage is less than a damage voltage of the controller, the set of high-side switches, or the set of low-side switches.

8. The motor control device of claim 5, wherein the first target voltage is between a rated voltage of the motor and a turn-off voltage of the controller.

9. The motor control device of claim 5, wherein the set of high-side switches comprises 3 transistors, and the set of low-side switches comprises 3 transistors.

* * * * *